United States Patent
Fatemi et al.

(10) Patent No.: US 12,073,178 B2
(45) Date of Patent: Aug. 27, 2024

(54) SYSTEMS AND METHODS FOR REFINING PRE-TRAINED LANGUAGE MODELS WITH IMPROVED GENDER FAIRNESS

(71) Applicant: salesforce.com, inc., San Francisco, CA (US)

(72) Inventors: Zahra Fatemi, Chicago, IL (US); Caiming Xiong, Menlo Park, CA (US); Wenhao Liu, Palo Alto, CA (US); Chen Xing, Palo Alto, CA (US)

(73) Assignee: Salesforce, Inc., San Francisco, CA (US)

( * ) Notice: Subject to any disclaimer, the term of this patent is extended or adjusted under 35 U.S.C. 154(b) by 389 days.

(21) Appl. No.: 17/586,504

(22) Filed: Jan. 27, 2022

(65) Prior Publication Data
US 2023/0104662 A1   Apr. 6, 2023

Related U.S. Application Data

(60) Provisional application No. 63/252,436, filed on Oct. 5, 2021.

(51) Int. Cl.
*G06F 40/279* (2020.01)
*G06F 40/35* (2020.01)
*G06F 40/56* (2020.01)
*G06N 3/045* (2023.01)
*G06N 3/08* (2023.01)

(52) U.S. Cl.
CPC .......... *G06F 40/279* (2020.01); *G06F 40/35* (2020.01); *G06F 40/56* (2020.01); *G06N 3/045* (2023.01); *G06N 3/08* (2013.01)

(58) Field of Classification Search
CPC ........ G06F 40/279; G06F 40/35; G06F 40/56; G06F 40/253; G06F 40/216; G06F 40/289; G06N 3/045; G06N 3/08; G06N 3/09
See application file for complete search history.

(56) References Cited

U.S. PATENT DOCUMENTS 10,885,279 B2 *   1/2021   Barachha .............. G06F 40/268

OTHER PUBLICATIONS

Webster et al, "Measuring and reducing gendered correlations in pre-trained models" 2020, 12 ppgs https://arxiv.org/abs/2010.06032v1 (Year: 2020).*
Devlin et al., "BERT: Pre-training of Deep Bidirectional Transformers for Language Understanding." In NAACL, 2019. https://arxiv.org/abs/1810.04805.

(Continued)

*Primary Examiner* — Linda Wong
(74) *Attorney, Agent, or Firm* — Haynes and Boone, LLP

(57) ABSTRACT

Embodiments are directed to a training framework for reducing gender bias in a pre-trained language model. To reduce gender bias a gender neutral dataset is generated. Next, parameters of the pre-trained language model are frozen and do not change during a subsequent training phase. As all the pre-trained parameters are frozen, forgetting of information from the original training data is minimized. New parameters are added to the language model. The new parameters may be associated with gender related terms, such as profession names. In a subsequent training phase the new parameters of the language model are trained using a gender neutral dataset.

20 Claims, 6 Drawing Sheets

(56) References Cited

OTHER PUBLICATIONS

Vaswani et al., "Attention is all you need." In Advances in Neural Information Processing Systems, pp. 5998-6008, 2017. https://proceedings.neurips.cc/paper/2017/hash/3f5ee243547dee91fbd053c1c4a845aa-Abstract.html.

Wu et al., "Taking notes on the fly helps language pre-training." In International Conference on Learning Representations, 2021. https://openreview.net/forum?id=IU5Rs_wCweN.

Wu et al., "Google's neural machine translation system: Bridging the gap between human and machine translation," 2016. https://arxiv.org/abs/1609.08144.

de Vassimon Manela et al., "Quantifying gender bias in pre-trained and fine-tuned language models." In Proceedings of the 16th Conference of the European Chapter of the Association for Computational Linguistics: Main Volume, pp. 2232-2242, 2021. https://discovery.ucl.ac.uk/id/eprint/10129955/.

Webster et al., "Measuring and reducing gendered correlations in pre-trained models," 2020. 12 pages. https://arxiv.org/abs/2010.06032.

Kurita et al., "Measuring bias in contextualized word representations." In Proceedings of the First Workshop on Gender Bias in Natural Language Processing, pp. 166-172, 2019. https://arxiv.org/abs/1906.07337.

Bolukbasi et al., "Man is to computer programmer as woman is to homemaker? Debiasing word embeddings." In Proceedings of the 30th International Conference on Neural Information Processing Systems, NIPS'16, pp. 4356-4364, Red Hook, NY, USA, 2016. Curran Associates Inc. ISBN 9781510838819. https://proceedings.neurips.cc/paper/2016/hash/a486cd07e4ac3d270571622f4f316ec5-Abstract.html.

Zhao et al., "Gender bias in coreference resolution: Evaluation and debiasing methods." In Proceedings of the 2018 Conference of the North American Chapter of the Association for Computational Linguistics: Human Language Technologies, vol. 2 (Short Papers), pp. 15-20, New Orleans, Louisiana, Jun. 2018. Association for Computational Linguistics. doi: 10.18653/v1/N18-2003. https://aclanthology.org/N18-2003.

Lample et al., "Neural architectures for named entity recognition." In Proceedings of the 2016 Conference of the North American Chapter of the Association for Computational Linguistics: Human Language Technologies, pp. 260-270, San Diego, California, Jun. 2016. Association for Computational Linguistics. doi: 10.18653/v1/N16-1030. https://aclanthology.org/N16-1030.

Goodfellow et al., "An empirical investigation of catastrophic forgeting in gradientbased neural networks." In Proceedings of International Conference on Learning Representations (ICLR, 2014). https:/arxiv.org/abs/1312.6211.

Kirkpatrick et al., "Overcoming catastrophic forgetting in neural networks." In Proceedings of the National Academy of Sciences, 114(13):3521-3526, 2017. ISSN 0027-8424. doi: 10.1073/pnas.1611835114. https://www.pnas.org/content/114/13/3521.

Yang et al., "Towards making the most of BERT in neural machine translation." In Proceedings of the AAAI Conference on Artificial Intelligence, volume 34, pp. 9378-9385, 2020. https://ojs.aaai.org/index.php/AAAI/article/view/6479.

\* cited by examiner

SYSTEMS AND METHODS FOR REFINING PRE-TRAINED LANGUAGE MODELS WITH IMPROVED GENDER FAIRNESS

CROSS-REFERENCE TO RELATED APPLICATIONS

This application is a nonprovisional of and claims priority under 35 U.S.C. 119 to U.S. Provisional Application No. 63/252,436, filed Oct. 5, 2021, which is hereby expressly incorporated by reference herein in its entirety.

TECHNICAL FIELD

The embodiments relate generally to machine learning systems and natural language processing (NLP), and more specifically to systems and methods for improving gender fairness of pre-trained language models.

BACKGROUND

Artificial intelligence (AI) models have been widely used in a variety of applications such as NLP tasks. Such models may be used to generate responses to questions, summarize texts, translate texts to a different language, and/or the like. Large language models, such as BERT and RoBERTa, have shown significant performance in a wide variety of NLP downstream applications. However, such models are often prone to exhibit gender bias, due to its large-scale unsupervised training data from the web, Wikipedia, books, and/or the like. Gender bias refers to unbalanced model behaviors with respect to a specific gender. Typically, a model inherits some of the gender bias from the training corpus. For example, Book Corpus and English Wikipedia data used to train the BERT model may often suffer from gender imbalance.

Given the large amount, diversity and opacity of the pre-training data, challenges remain in correcting the gender bias of a pre-trained language model. Even if a pre-trained language model is released to the general public, getting access to the original pre-training data and manually filtering out most or all bias-related text used in training is technically impractical.

Therefore, there is a need for a mechanism to improve gender bias in language models.

Figure 1:
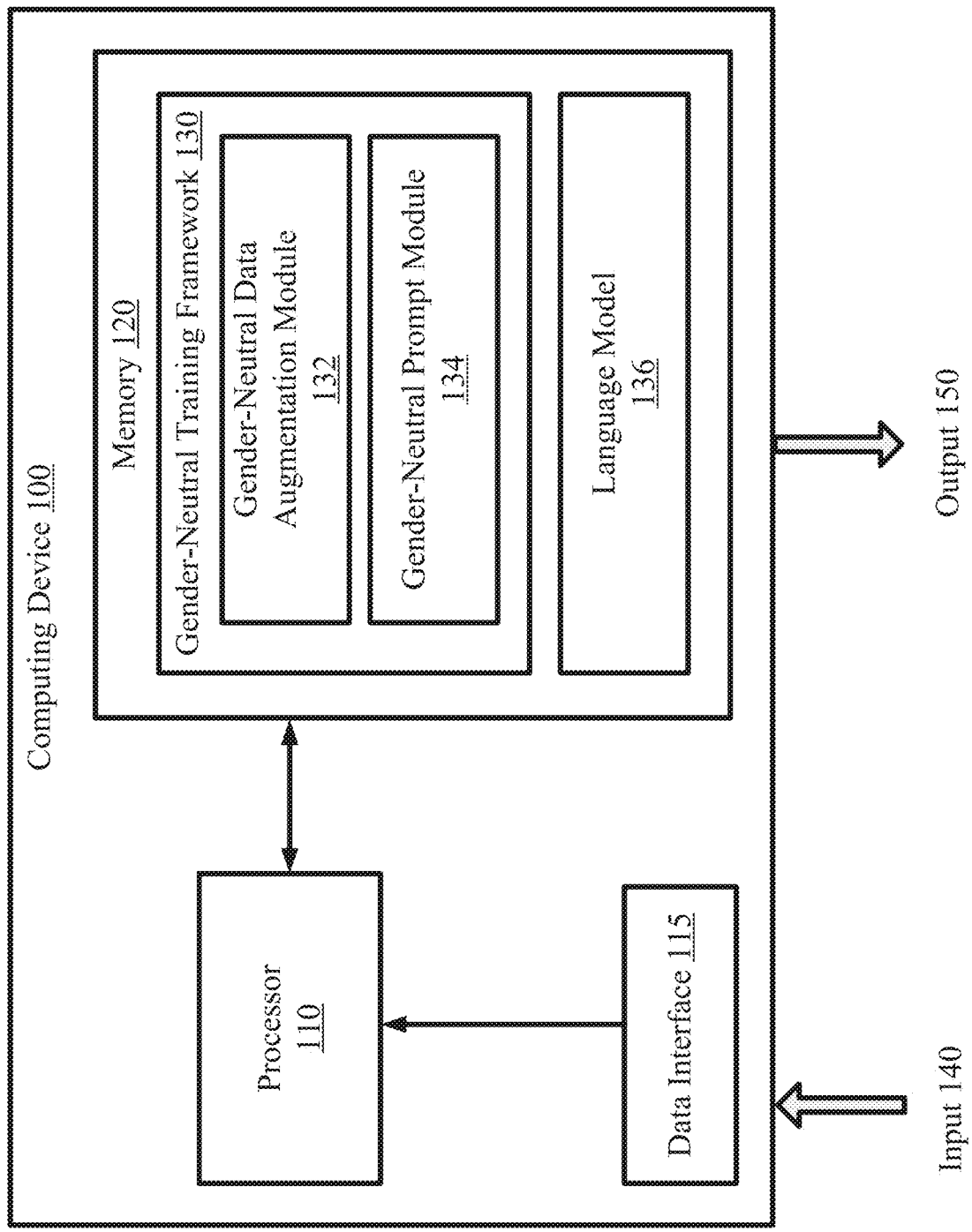
FIG. 1 is a simplified diagram of a computing device that implements a gender-neutral training framework, according to some embodiments described herein.

In the figures, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Artificial intelligence implemented with neural networks and deep learning models has demonstrated promise as a technique for automatically analyzing real-world information with human-like accuracy. In general, such neural network and deep learning models receive input information and make predictions based on the same. Whereas other approaches to analyzing real-world information may involve hard-coded processes, statistical analysis, and/or the like, neural networks learn to make predictions gradually, through trial and error, in a machine learning process. A given neural network model may be trained using a large number of training samples, processing those training samples iteratively until the neural network model begins to consistently make similar inferences from the training examples that a human might make. Neural network models have been shown to outperform and/or have the potential to outperform other computing techniques in a number of applications.

However, performance of such AI models, including language models used to perform NLP tasks such as question answering, text summarization, machine translation, etc., are often prone to exhibit gender bias, due to its large-scale unsupervised training data from the web, Wikipedia, books, and/or the like. Gender bias refers to unbalanced model behaviors with respect to a specific gender. Typically, a model inherits some of the gender bias from the training corpus used to train the model.

To address the gender bias in language models, some existing systems recollect and build gender-neutral data on their own and conduct a second phase pre-training on the released pre-trained language model with the gender-neutral data. However, given the limited size of the gender-neutral data and potential distributional mismatch with the original pre-training data, catastrophic forgetting problem may occur during the second-phase pre-training of the language models. Catastrophic forgetting is a long-standing problem in deep learning, which illustrates the tendency of a neural network to forget previously learned information upon learning new information. In the second-phase pre-training of the pre-trained model that uses the limited gender-neutral data to keep updating the entire massive model, the model may potentially forget the diverse information learned the original pre-training data during a previous phase. As the diversity and amount of training data is closely relevant to the pre-trained model's performance on downstream tasks, forgetting results learned from the original training data may damage the model's downstream performance by a large margin.

Even if the gender-neutral data for second-phase pre-training comes from the original training data set, the catastrophic forgetting problem may still occur if the size of de-biased data is smaller than that of original training data. For instance, to build the gender-neutral data set for second-phase pre-training, English Wikipedia text may be filtered to identify sentences with occupations and professions, such as "nurse," "babysitter," and/or the like. Then, for each of these sentences, person entities are anonymized and the gender-related terms are swapped out, such as "he" to "she", to form new sentences. Next, these new sentences are mixed together with the original occupation related sentences as the gender-neutral data for second-phase pre-training. In the particular example, the size of the gender-neutral data is 78.3% of the Wikipedia and Book Corpus data, the original pre-training data of the language model, e.g., the BERT base model. In this case, although the two data sets are similar to each other in size and the gender-neutral data for second-phase pre-training is not significantly smaller than the original data, the language model's performance on downstream tasks, such as General Language Understanding Evaluation (GLUE), still drops by a considerable margin.

In view of the gender bias issues in language models, embodiments herein are directed to a gender-neutral training framework that learns gender-related prompts to reduce gender bias, conditioned on freezing parameters of the pre-trained models. Specifically, all, most, or a number of parameters above a threshold in the original parameters of the pre-trained model are frozen. New parameters that correspond to the gender equality prompts are added, and the new parameters are updated during the second-phase pre-training. As the original pre-trained parameters are frozen, forgetting information from the original training data may be largely alleviated. As for the gender equality prompts, the gender-neutral training framework trains new word/token embeddings of profession names as gender equality prompts at second-phase pre-training. Since the embeddings of profession names are newly re-initialized when de-bias training starts, gender bias from previous data that is embedded in such representations is already removed before second-phase pre-training. Therefore, the gender bias mechanism does not have to train the model to find and fix bias from scratch. This makes de-bias training faster. Because the gender bias issue is often the most prominent on profession names, training new embeddings for the swapped profession names as gender equality prompts improves gender bias in the pre-trained language models.

One way to de-bias a language model is to construct a dataset with proportionate number of references to male and female genders by augmenting data on the English Wikipedia corpus. The English Wikipedia corpus may be an original dataset used to pre-train language models. The original dataset may be filtered for sentences containing at least one profession that is supposed to be gender-neutral but generally viewed with gender bias, e.g., "nurse," "babysitter," "doctor," and/or the like. For the sentences in the original dataset that include gender terms, the gendered terms are swapped with the opposite genders (e.g., "man" to "woman," "he" to "she," and vice versa).

In another embodiment, gender related name terms, such as person name entities in each sentence may be identified and replaced with anonymized entities. For example, person name entities, such as "Maria," "David," and "Peter" may be replaced to "ANON1." In this way, the resulting gender neutral dataset would include anonymized original and gender-swapped sentences.

In one embodiment, after the gender-neutral data set is built, all, most, or above a predefined threshold number of model parameters with valued determined during a previous phase of the pre-training are frozen and new trainable parameters are added. Since the pre-trained parameters are frozen, the forgetting of information from the original training data may be alleviated. Because gender bias issue is most prominent on profession names, the new trainable parameters may be new word and/or token embeddings of profession names. Thus, at second-phase pre-training, only the newly added token embeddings of profession names are updated with the gender-neutral data, conditioned on the original pre-trained model.

FIG. 1 is a simplified diagram of a computing device that implements the gender-neutral training framework, according to some embodiments described herein. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein. For example, as shown, memory 120 includes instructions for a gender-neutral training framework 130 and a language model 136 that may be used to implement and/or emulate the systems and models, and/or to implement any of the methods described further herein. Both gender-neutral training framework 130 and language model 136 may receive an input 140, e.g., such as an NLP input, text input, etc., via a data interface 115. The data interface 115 may be any of a user interface that receives a user NLP input, or a communication interface that may receive or retrieve a previously stored NLP training input, such as training corpus from memory 120 or another storage, e.g. a database communicatively connected to computing device 100. Gender-neutral training framework 130 may receive a dataset and/or pre-trained language model as input 140 and generate output 150 which may be a gender neutral dataset or language model 136 trained using a gender neutral dataset. Language model 136 may receive NLP input that includes a natural language question, document, etc., as input 140 and generate output 150 that may be a response to the input, including a gender neutral answer to a natural language question, a gender neutral document summary, etc. Notably, the language model 136 that is trained to generate gender neutral output 150 has a variety of applications. Example applications may include translating natural language text, summarizing documents, answering natural language queries, translating text into a different language, etc.

One example of language model 136 may be a bidirectional encoder representations from transformers (BERT) model. BERT may be a neural network model that includes multi-layer bidirectional transformer encoder that may transform a sequence of token embeddings and position embeddings into contextual representations of the tokens. The tokens may be generated from text input that BERT breaks into individual words or tokens. BERT may be a stack of transformer layers, where each layer includes at least two sub-layers. One sublayer may be a self-attention layer and a second sublayer may be a position-wise fully connected feed-forward neural network. Each layer may be followed by a residual connection and a layer normalizer.

In some embodiments, the self-attention layer produces output by calculating a scaled dot product of queries and keys as the coefficient values as follows:

$$\text{Attention}(Q, K, V) = \text{Softmax}\left(\frac{QK^T}{\sqrt{d}}\right)V \quad \text{Eq. (1)}$$

where Q is a query, K is a key, and V is a value, and Q, K, V are the hidden representations outputted from the previous layer of the BERT model to subsequent layer, and d is a dimension of the hidden representations. To give the attention layer multiple representation subspaces and expand the model's ability to focus on different positions, the self-attention layer of transformers is extended to a multi-headed attention mechanism as follows:

$$\text{MultiHead}(Q,K,V)=\text{Concat}(\text{head}_1,\ldots,\text{head}_H)W^O \quad \text{Eq. (2)}$$

$$\text{head}_k=\text{Attention}(QW_k^Q,KW_k^K,VW_k^V) \quad \text{Eq. (3)}$$

where $W_k^Q \in \mathbb{R}^{d \times d_K}$, and $W_k^K \in \mathbb{R}^{d \times d_K}$, and $W_k^V \in \mathbb{R}^{d \times d_V}$ are projection matrices, H is a number of heads, and $d_K$ and $d_V$ are the dimensions of the key and value, respectively.

In some embodiments, the outputs of the multi-headed attention layer are fed to a fully connected feed-forward network (FFN). The FNN may consist of two linear projects and a rectifier linear unit (ReLU) activation in between, as follows:

$$\text{FFN}(h_i)=\delta(h_1W_1+b_1)W_2+b_2 \quad \text{Eq. (4)}$$

where $W_1$, $W_2$, $b_1$, and $b_2$ are parameters.

In some embodiments, language model 136 may be trained using multiple phases. After the first phase, language model 136 may be considered pre-trained. A language model 136 that is pre-trained, such as a pre-trained BERT, may be trained on various datasets, such as BooksCorpus that includes 800M or so words and an English Wikipedia corpus that includes 2,500M words, with two unsupervised objective functions, including a masked language modeling (MLM) function and a next sentence prediction function. In the masked language modeling, 15% of all tokens in each sequence are replaced with [MASK] token at random and the model attempts to predict the masked tokens based on the context of unmasked words in the sequence. In the next sentence prediction task, the input to the language model 136 is sequences of sentences, and the language model 136 learns to predict if the current sentence is subsequent of the previous sentence in the training corpus. For fine-tuning, the language model 136 is initialized with the pre-trained parameters, and a new classification head is added to the language model 136. Then, all of the parameters are fine-tuned using labeled data from the downstream tasks.

The gender-neutral training framework 130 may train language model 136 during a second phase. In other words, gender-neutral training framework 130 may further train language model 136 that has already been pretrained as discussed above to generate output 150 that is gender neutral. Gender-neutral training framework 130 may include the gender-neutral data augmentation module 132 and a gender-neutral prompt module 134. The gender-neutral data augmentation module 132 may receive a training dataset as input 140 and generate a gender-neutral dataset from the training dataset 140. Gender-neutral prompt module 134 may generate a set of gender-neutral prompts using the gender-neutral dataset and update newly added embeddings of the gender-neutral prompts while freezing parameters of the language model 136 that has been pre-trained. The gender-neutral training framework 130, gender-neutral data augmentation module 132 and a gender-neutral prompt module 134 may be implemented by hardware, software and/or a combination thereof.

Figure 2:
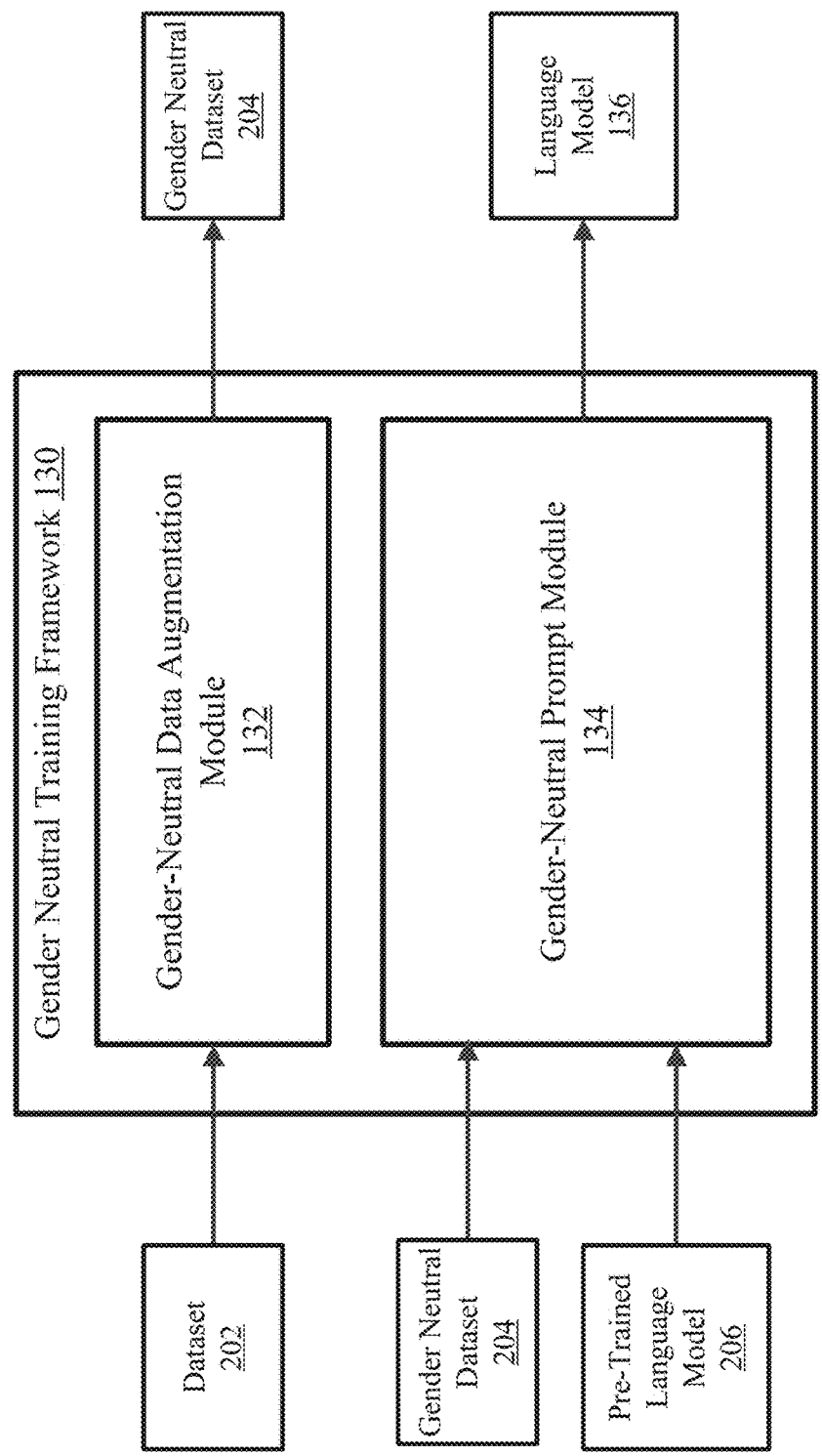
FIG. 2 is a simplified diagram illustrating gender-neutral training framework, according to some embodiments.

FIG. 2 is a block diagram 200 of a gender-neutral training framework 130, according to some embodiments. As illustrated in FIG. 2, gender-neutral training framework 130 includes gender-neutral data augmentation module 132 and gender-neutral prompt module 134, according to some embodiments.

The gender-neutral data augmentation module 132 may receive dataset 202 and construct a gender-neutral dataset 204 with proportionate numbers of references to male and female genders. Dataset 202 may be a training set used to originally pre-train language model 136, and may be an English Wikipedia dataset. Pre-trained language model 206 may be model 136 discussed above that has been pre-trained on dataset 202, but has not yet been trained on gender-neutral dataset 204. Dataset 202 typically includes gender biased data. Because pre-trained language model 206 is trained on gender biased data, the pre-trained language model 206 may be biased and generate biased results.

To minimize bias, the pre-trained language model 206 may be trained using gender-neutral dataset 204. Gender-neutral data augmentation module 132 may construct gender-neutral dataset 204 from dataset 202. Specifically, gender-neutral data augmentation module 132 may filter the dataset 202 for sentences containing gender biased terms. Sentences containing gender biased terms may include sentences that include at least one profession. A profession supposed to be gender-neutral but may be viewed with gender bias, e.g., nurse (female), babysitter (female), doctor (male), and the like. When dataset 202 is an English Wikipedia dataset, there may be 16,313,783 sentences that include a profession. For each of these sentences, gender-neutral data augmentation module 132 may swap the gendered related terms with the terms' opposite genders, such as swapping "man" for "woman", "he" for "she", and vice-versa. Next, gender-neutral data augmentation module 132 may identify gender-related names in the sentences, such as gender related person names entities. Example gender related person name entities may be "Maria," "David," and "Peter." The identified gender related person name entities may be replaced with anonymized term, entities, or tokens, such as "ANON1". The gender-neutral dataset 204 may include the swapped gender terms and anonymized entities. Gender-neutral data augmentation module 132 may also substitute other gender related terms not described above in a similar manner.

The gender-neutral prompt module 134 may train language model 206 during a second phase. For example, gender-neutral prompt module 134 may receive language model 206 and train language model 206 using gender-neutral dataset 204. To minimize catastrophic forgetting during the second phase of training, gender-neutral prompt module 134 may freeze all, most, or a above a predefined threshold number of parameters in language model 206. The frozen parameters may include parameters that have values that were set when language model 206 was pre-trained. For example, suppose language model 206 is a BERT model that has e.g., twelve neural network layers, with the layers having parameters that have values as a result of the language model 206 being pre-trained. During the second phase, gender-neutral prompt module 134 may freeze the parameters in the twelve neural network layers. 206. Since gender-neutral prompt module 134 freezes all, most, or a above a predefined threshold number of the pre-trained language model parameters, the forgetting of information from the original training data may be alleviated and/or minimized.

In some embodiments, gender-neutral prompt module 134 may add new trainable parameters to language model 206. The new parameters may be word or token embeddings in the embedding layers of language model 206. Notably, adding parameters to the embedding layer is exemplary, and new parameters may be added to other layers of language model 206. The new parameters may correspond to gender related terms. For example, because gender bias issue is most prominent on gender related terms such as profession names, gender-neutral prompt module 134 may add new embeddings of profession names as new parameters. The new parameters may be initialized randomly.

Gender-neutral prompt module 134 may train the language model 206 with new parameters on the gender-neutral dataset 204. During training, values to the new parameters are assigned based on the gender-neutral dataset 204 which minimizes gender bias. The language model 206 trained on the gender-neutral dataset 204 is language model 136. Because the new parameters are updated during training with the gender-neutral dataset 204 while the previously trained parameters remain frozen, language model 136 trained using gender-neutral dataset 204 generates results that reduces gender bias without experiencing catastrophic forgetting.

Suppose $X=\{x_1, x_2, \ldots x_n\}$ denotes the original, gender biased vocabulary used to pre-trained language model 206. The gender-biased vocabulary X may be dataset 202. Suppose that $W_x \in \mathbb{R}^{n \times d}$ is the token embedding matrix of the pre-trained language model 206. The token embedding matrix may include embeddings from an embedding layer of the language model 206. The embedding matrix may have dimension of d.

In some embodiments, given a set of m profession names $\{p_1, p_2, \ldots p_m\}$, or other gender related words, gender-neutral prompt module 134 may build an embedding matrix $W_p \in \mathbb{R}^{m \times d}$. Embedding matrix $W_p$ may be the embedding matrix that stores new parameters discussed above. Embedding of each token in matrix $W_p$ may be initialized randomly. To obtain an integrated word embedding matrix, gender-neutral prompt module 134 may concatenate $W_x$ and $W_p$ into matrix $W_{emb}=\text{Concat}(W_x, W_p)$, which represents both new and frozen parameters of the embedding layer. Language model 136 may use $W_{emb} \in \mathbb{R}^{(n+m) \times d}$ as the word embedding matrix for downstream tasks. The parameters of the entire language model 206 including the frozen parameters and new parameters may be represented as $W_{base}$.

During second-phase training and fine-tuning, gender-neutral prompt module 134 may train the pre-trained language model 206 using gender-neutral dataset 204. When the gender related terms, e.g., profession names are present in the input sequence of gender-neutral dataset 204, gender-neutral prompt module 134 may update the new embeddings in $W_p$ that pertain to gender related terms. Given the language model 206 parameters $W_{base}$, the objective function for minimizing loss during the second-phase pre-training may be as follows:

Eq. (5)
$$\mathcal{L}(x_{masked} | x_{context}, W_{base}) = \frac{1}{N_{mask}} \left( \sum_{t=1}^{N_{mask}} -\log p_\theta(x_t | x_{context}, W_{base}) \right) \quad (5)$$

where $N_{mask}$ is the number of masked positions in the input sequence x. Input sequence x may be a sentence in gender-neutral dataset 204. With such an objective function, $W_p$ is updated with gender-neutral data. By training new embeddings $W_p$ for biased terms, such as profession names, gender-neutral prompt module 134 not only minimizes catastrophic forgetting, but is also effective at de-biasing biased results. Because in gender-neutral prompt module 134, the embeddings of gender related terms, e.g., profession names, are newly re-initialized before debiasing training starts, gender bias from previous data embedded in such representations is already removed before second-phase pre-training. Therefore, gender-neutral prompt module 134 does not have to train the pre-trained language model 206 to find and fix bias from scratch, which can make the debiasing faster.

Figure 3:
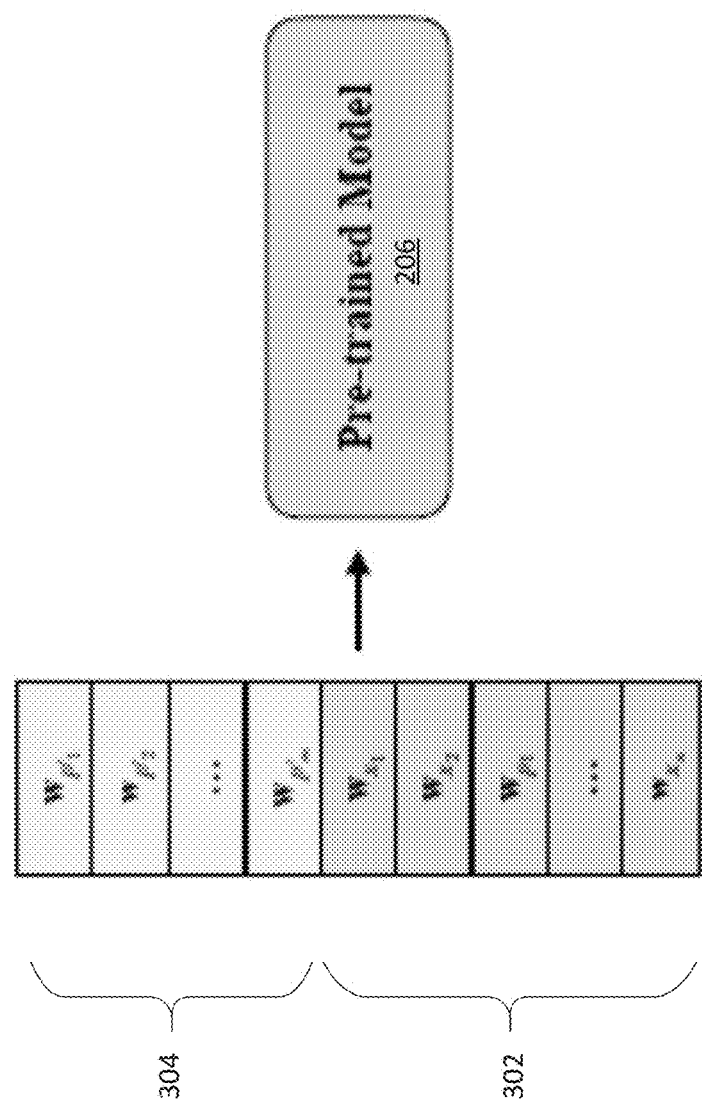
FIG. 3 is a simplified block diagram illustrating parameters trained using a gender-neutral training framework, according to some embodiments.

FIG. 3 is a simplified block diagram 300 illustrating parameters trained using a gender-neutral training framework, according to some embodiments. For example, let $X=\{x_1, x_2, \ldots, x_n\}$ denote dataset 202 used to pre-trained language model 206. Let $P=\{p_1, p_2, \ldots, p_m\}$ represent m gender biased terms, such a professional names. In this case, the parameters of the embedding layer of the pre-trained language model 206 may be represented as $W_x=\{w_{x_1}, w_{x_2}, \ldots, w_{x_n}, w_{p_1}, w_{p_2}, \ldots, w_{p_n}\}$ and shown as parameters 302. Parameters $w_{p_1}, w_{p_2}, \ldots, w_{p_n}$ reflect parameters of the professional names that were pre-trained using a biased dataset 202. Gender-neutral prompt module 134 may then add new gender-neutral parameters $W_p=\{p'_1, p'_2, \ldots, p'_n\}$, shown as new gender-neutral parameters 304. During the second phase training with gender-neutral dataset 204, gender-neutral prompt module 134 randomly initializes and updates parameters 304, while freezing parameters 302.

Figure 4:
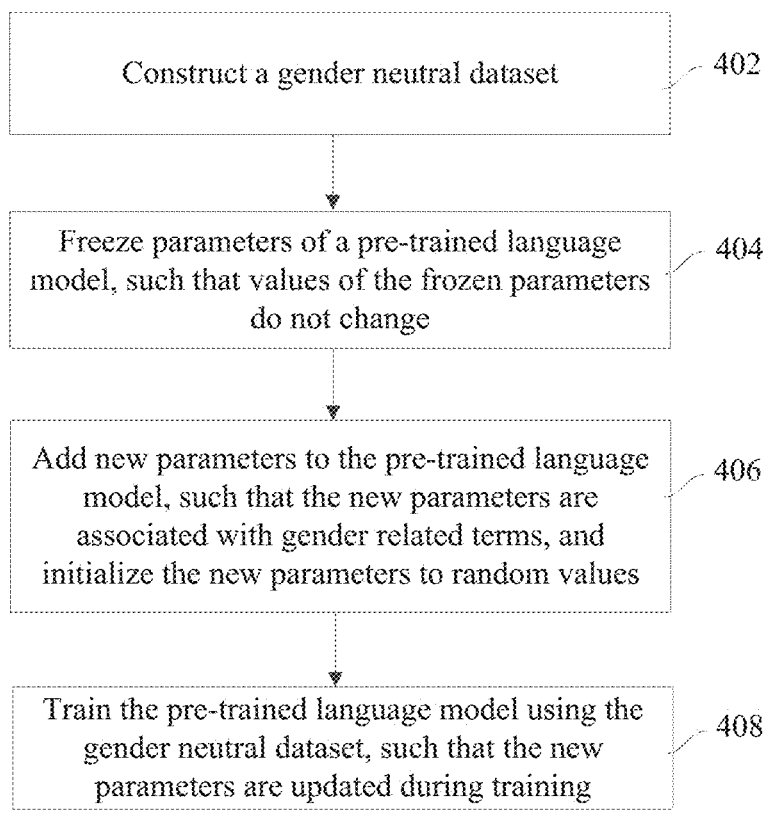
FIG. 4 is a simplified diagram of a method for training a pre-trained language model using a gender-neutral training framework, according to some embodiments.

FIG. 4 is a simplified diagram of a method 400 for training a pre-trained language model using a gender-neutral training framework, according to some embodiments. One or more of the processes 402-408 of method 400 may be implemented, at least in part, in the form of executable code stored on non-transitory, tangible, machine-readable media that when run by one or more processors may cause the one or more processors to perform one or more of the processes 402-408. Prior to method 400, language model 136 may have been pre-trained using a dataset, such as dataset 202 which may include gender biased data.

At process 402, a gender neutral dataset is constructed. For example, dataset 202 is filtered for sentences containing at least one gender biased term, e.g. a profession, that is supposed to be gender neutral but is generally viewed as biased. The gender biased terms in the sentences is swapped with the opposite gender. Additionally, the person name entities in dataset 202 are anonymized, using anonymous tokens, such as "ANON1." Person name entities may also be included in the filtered sentences. The gender neutral dataset may be gender-neutral dataset 204.

At processes 404-408, a second phase for training a language model occurs. During the second phase, the language model 206 is trained to generate gender neutral results.

At process 404, parameters of the language model 206 are frozen. For example, after the language model 206 is pre-trained during the first phase, the language model 136 includes parameters with different values. The parameters may be throughout different layers of language model 206. These parameters are frozen during the second phase. Once frozen, the values of the parameters do not change.

At process 406, new parameters are added. For example, new parameters are added to the language model 206. The new parameters may be added to the embedding layer of language model 206. The new parameters may be initialized to random values. Further, the new parameters may represent gender related terms, such as profession names.

At process 408, the new parameters are updated. For example, during the second phase of training, language model 206 is trained gender neutral dataset, such as gender-neutral dataset 204, which causes the new parameters to be updated. In some embodiments, process 408 may be iterative and repeat multiple times until the objective function is minimized. The trained language model 206 is language model 136.

Figure 5:
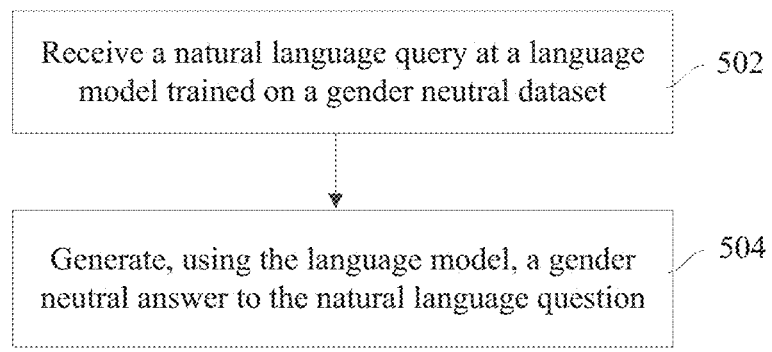
FIG. 5 is a simplified diagram of a method for processing text using a language model trained using a gender-neutral training framework, according to some embodiments.

FIG. 5 is a simplified diagram of a method 500 for generating output using the language model 136, according to some embodiments. One or more of the processes 502-504 of method 500 may be implemented, at least in part, in the form of executable code stored on non-transitory, tangible, machine-readable media that when run by one or more processors may cause the one or more processors to perform one or more of the processes 502-504.

At process 502, a natural language input is received. For example, language model 136 trained as discussed in FIG. 4, receives a natural language input that includes written text, document, etc., as input 140.

At process 504, an output is generated. For example, language model 136 may break the natural language text received in process 502 into words or tokens, embed the words or tokens into embeddings using parameters that were frozen in process 404 and added and trained in processes 406 and 408, decode the embeddings and generate an output 150 to the natural language input. The output 150 may be a gender neutral as compared to an output to the same question generated using conventional language models.

Figure 6:
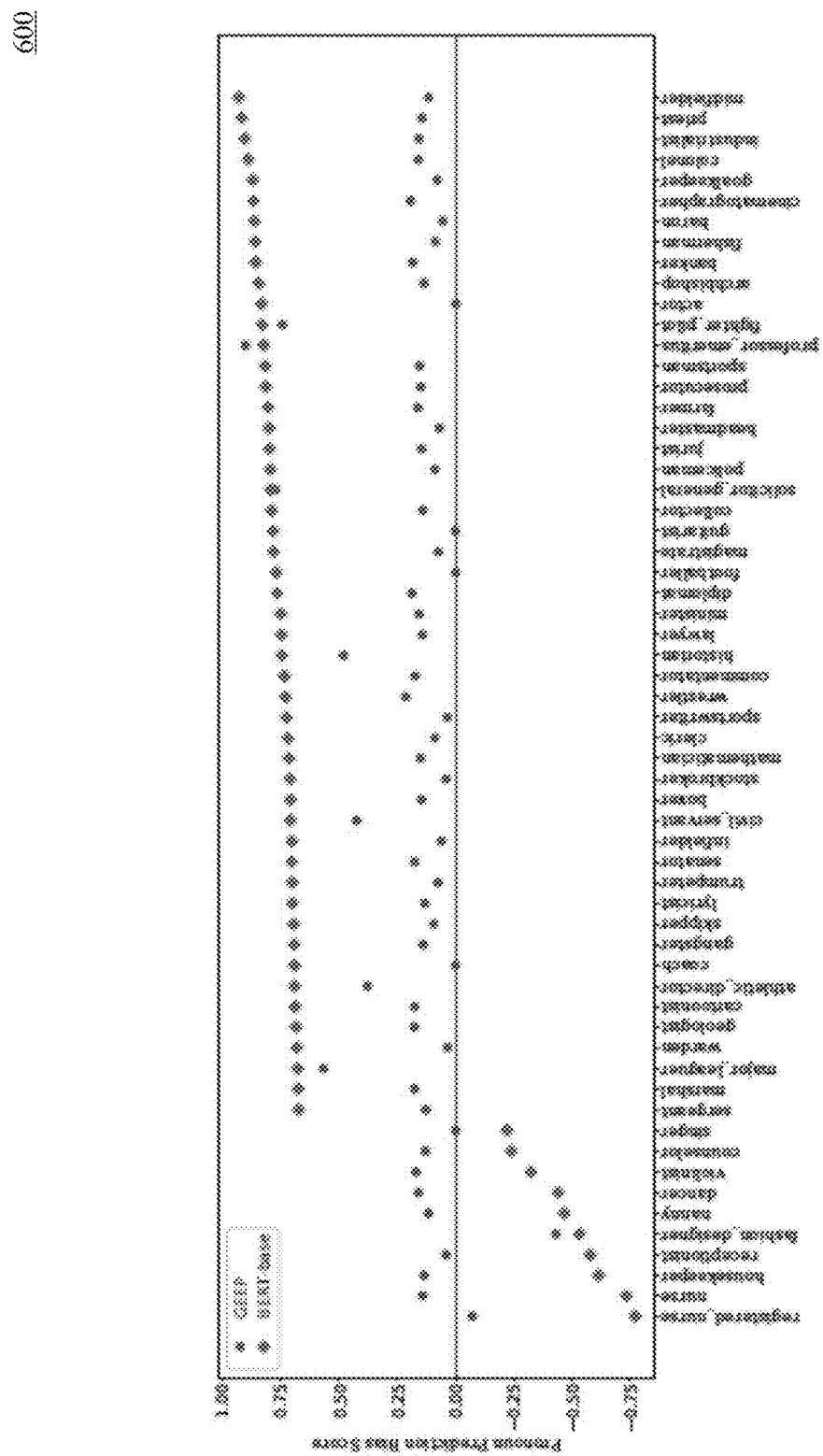
FIG. 6 is a chart illustrating results from a language model trained using a gender-neutral training framework and a conventional language model, according to some embodiments.

FIG. 6 is a chart illustrating results of a trained language model 136 and a conventional base BERT model generating pronoun prediction score for professional names, according to some embodiments. In the example in FIG. 6, a template containing a pronoun and a profession is defined. The profession is gender-neutral, but is viewed with gender bias. By masking the pronoun, language model 136 and a conventional base BERT model are queried to predict the pronouns at the masked position given the context, including the profession. For example, suppose a profession "registered nurse" is masked with a [MASK]. The difference between the probabilities of filling the masked position in each sentence with "he" and "she", is used to show gender bias in the model using the equation below:

$$\text{Pronoun Prediction Bias Score} = \text{Prob}(\text{"he"}) - \text{Prob}(\text{"she"}) \qquad \text{Eq. (6)}$$

FIG. 6 illustrates that the pronoun prediction bias scores generated using language model 136 and conventional BERT model for various professions. The dots illustrate the bias scores generated using the trained language model 136, while the squares illustrate the bias scores generated using the base BERT model. Compared with the base BERT, the scores generated by the language model 136 are significantly closer to zero, indicating that the language model 136 is more effective at removing gender bias from such biased professions compared with the base BERT.

Some examples of computing devices, such as computing device 100 may include non-transitory, tangible, machine readable media that include executable code that when run by one or more processors (e.g., processor 110) may cause the one or more processors to perform the processes of methods 400 and 500. Some common forms of machine-readable media that may include the processes of methods 400 and 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for training a neural network language model to a generate gender-neutral output, the method comprising:
obtaining a gender-neutral dataset for training the neural network language model that has been previously trained to generate output for a text input;
freezing parameters of the neural network language model, wherein values of the parameters were determined during the previous training of the neural network language model and wherein the values of the parameters do not change after the parameters are frozen;
adding new parameters to the neural network language model, the new parameters associated with gender related terms; and
training the neural network language model using the gender-neutral dataset, wherein the training modifies values of the new parameters and not the values of the frozen parameters, and wherein the trained neural network language model generates the gender-neutral output for the text input.

2. The method of claim 1, wherein obtaining the gender-neutral dataset further comprises:
identifying a set of sentences containing at least one gender-related term from a training dataset; and
swapping, in the identified set of sentences, the at least one gender-related term with an opposite gender term.

3. The method of claim 1, wherein obtaining the gender-neutral dataset further comprises:
identifying a set of sentences containing at least one gender-related name term from a training dataset; and
replacing, in the identified set of sentences, the at least one gender-related name term with an anonymized term.

4. The method of claim 1, wherein the neural network language model includes at least one self-attention layer and at least one feed-forward neural network, and wherein the frozen parameters are in the at least one self-attention layer and the at least one feed-forward neural network.

5. The method of claim 1, wherein the new parameters are added to an embedding layer of the neural network language model.

6. The method of claim 1, wherein the values of the new parameters are randomly initialized.

7. The method of claim 1, further comprising:
generating an embedding matrix, the embedding matrix including a portion of the frozen parameters and the new parameters; and
updating the new parameters and not the frozen parameters in the embedding matrix during training the neural network language model using the gender-neutral dataset.

8. The method of claim 1, further comprising:
receiving the text input at the trained neural network language model; and
generating, using the new parameters and frozen parameters of the neural network language model, the gender-neutral output.

9. A system for training a neural network language model to generate gender neutral output, the system comprising:
a memory configured to store the neural network language model; and
a processor coupled to the memory and configured to execute instructions for training the neural network language model, the instructions comprising:
obtaining a gender-neutral dataset for training the neural network language model that has been previously trained to generate output for a text input;
freezing parameters of the neural network language model, wherein values of the parameters were determined during previous training of the neural network language model and wherein the values of the parameters do not change after the parameters are frozen;
adding new parameters to the neural network language model; and
training the neural network language model using the gender-neutral dataset, wherein the training modifies values of the new parameters and not the values of the frozen parameters, and wherein the trained neural network language model generates the gender-neutral output for the text input.

10. The system of claim 9, wherein to obtain the gender-neutral dataset, the instructions further comprise:
identifying a set of sentences containing at least one gender-related term from a training dataset; and
swapping, in the identified set of sentences, the gender-related term with an opposite gender term.

11. The system of claim 9, wherein to obtain the gender-neutral dataset, the instructions further comprise:
identifying a set of sentences containing at least one gender-related name term from a training dataset; and
replacing, in the identified set of sentences, the at least one gender-related name term with an anonymized term.

12. The system of claim 9, wherein the neural network language model includes at least one self-attention layer and at least one feed-forward neural network and wherein the frozen parameters are in the at least one self-attention layer and the at least one feed-forward neural network.

13. The system of claim 9, wherein the new parameters are added to an embedding layer of the neural network language model.

14. The system of claim 9, wherein the values of the new parameters are randomly initialized.

15. The system of claim 9, wherein the instructions further comprise:
generating an embedding matrix, the embedding matrix including a portion of the frozen parameters and the new parameters; and
updating the new parameters and not the frozen parameters in the embedding matrix during training the neural network language model using the gender-neutral dataset.

16. The system of claim 9, wherein the instructions further comprise:
receiving the text input at the trained neural network language model; and
generating, using the new parameters and frozen parameters of the trained neural network language model, the gender-neutral output.

17. A non-transitory computer readable medium having instructions stored thereon, that when executed by a processor cause the processor to perform operations, the operations comprising:
obtaining a gender-neutral dataset for training a neural network language model that has been previously trained to generate output for a text input;
freezing parameters of the neural network language model, wherein values of the parameters were determined during previous training of the neural network language model and wherein the values of the parameters do not change after the parameters are frozen;
adding new parameters to the neural network language model; and training the neural network language model using the gender-neutral dataset, wherein the training modifies values of the new parameters and not the values of the frozen parameters, and wherein the trained neural network language model generates a gender-neutral output for the text input.

18. The non-transitory computer readable medium of claim 17, wherein the neural network language model includes at least one self-attention layer and at least one feed-forward neural network, and wherein the frozen parameters are in the at least one self-attention layer or the at least one feed-forward neural network.

19. The non-transitory computer readable medium of claim 17, wherein the new parameters are added to an embedding layer of the neural network language model and the values of the new parameters are randomly initialized.

20. The non-transitory computer readable medium of claim 19, wherein the operations further comprise:
generating an embedding matrix, the embedding matrix including a portion of the frozen parameters and the new parameters; and
updating the new parameters and not the portion of the frozen parameters in the embedding matrix when training the neural network language model with the gender-neutral dataset.

* * * * *